UNITED STATES PATENT OFFICE.

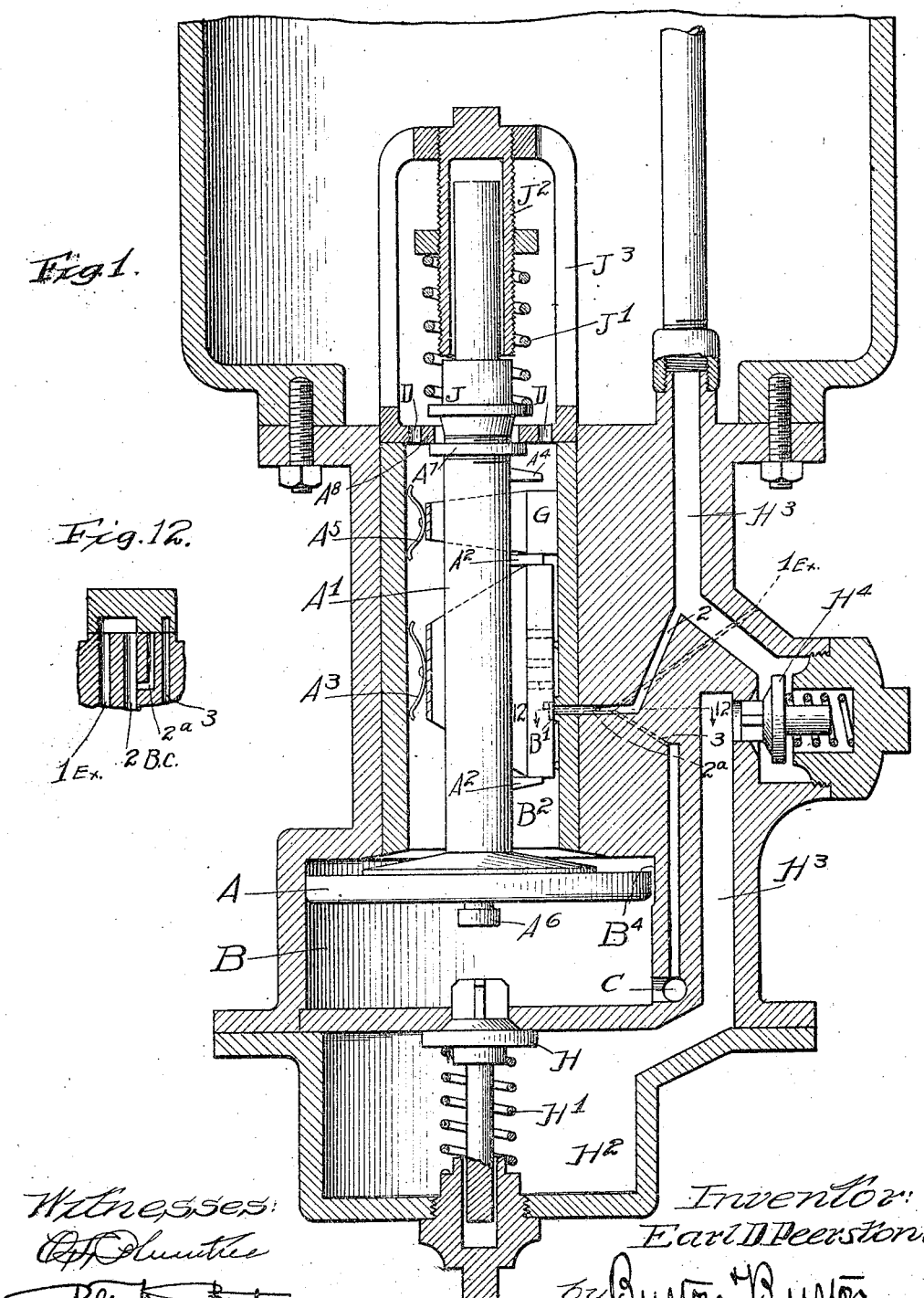

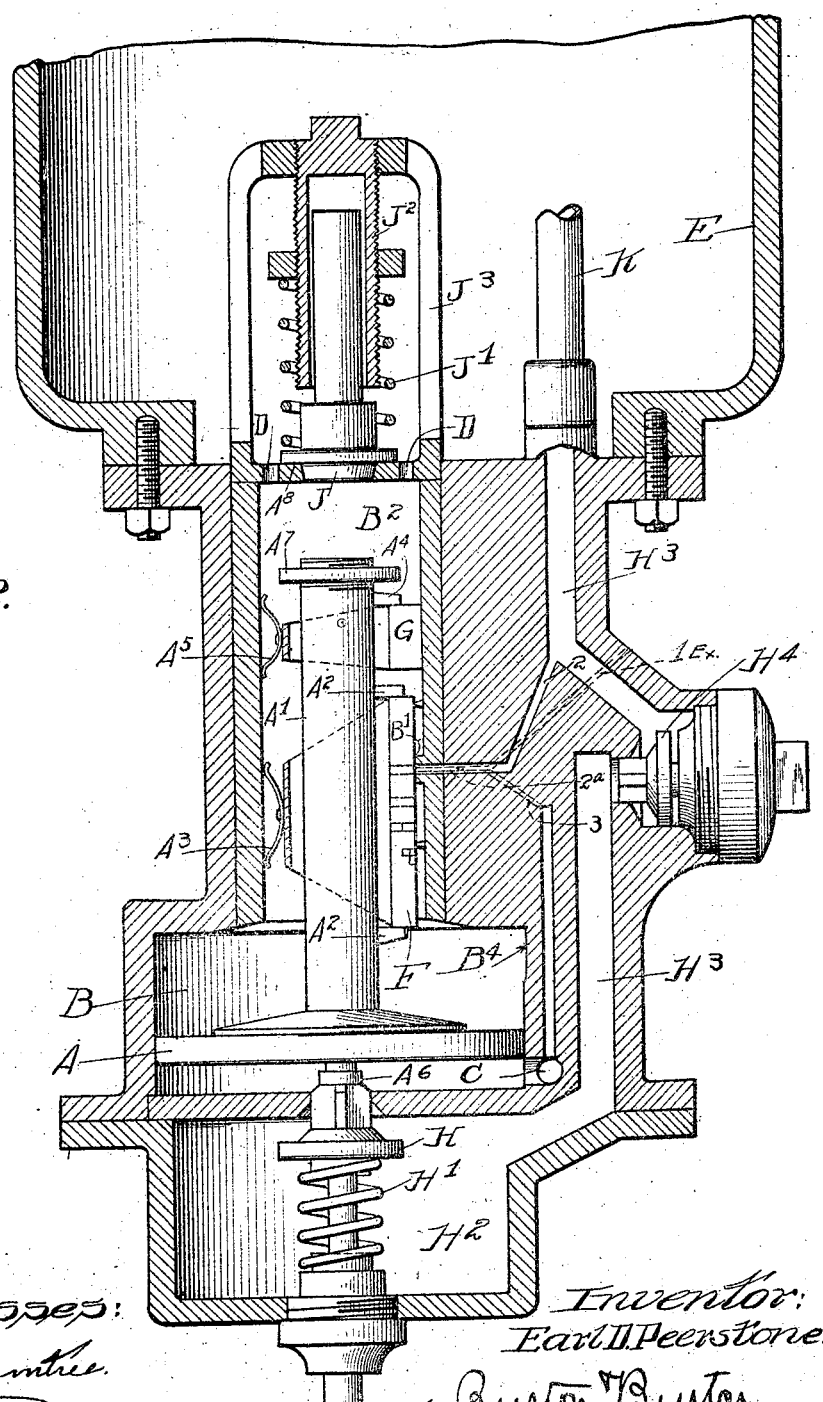

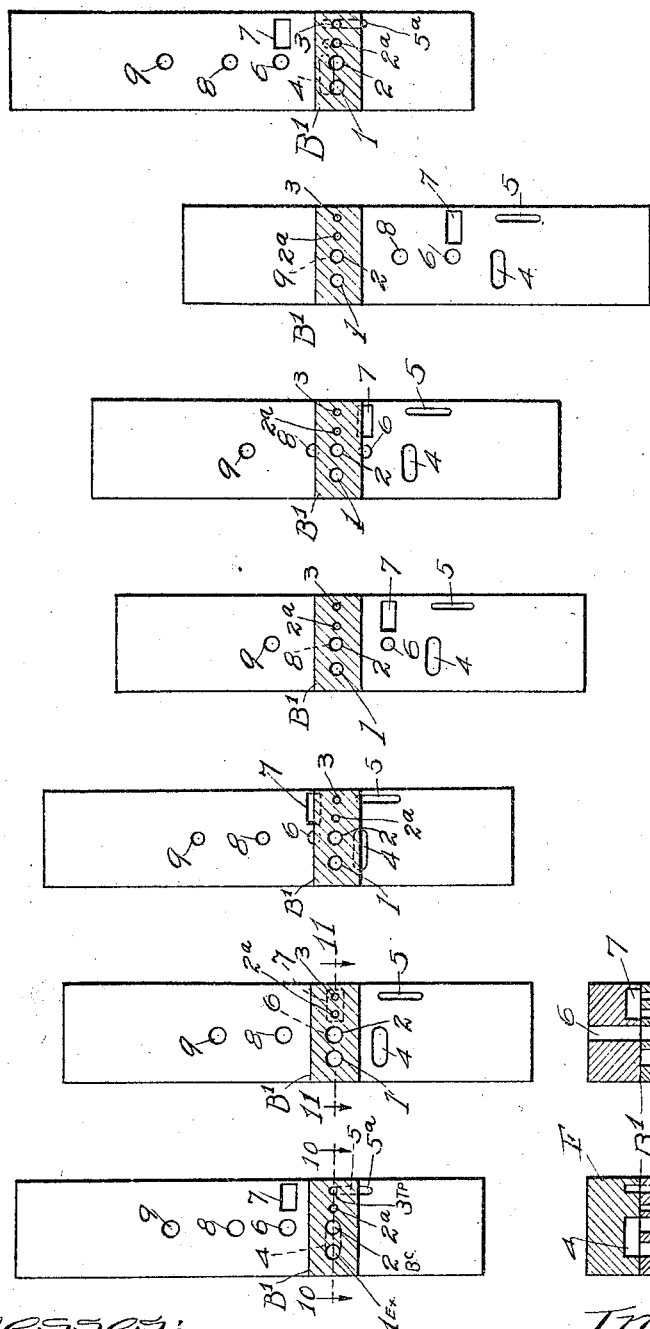

EARL D. PEERSTONE, OF CHICAGO, ILLINOIS.

TRIPLE-VALVE DEVICE.

1,051,000.

Specification of Letters Patent.

Patented Jan. 21, 1913.

Application filed June 12, 1912. Serial No. 703,138.

*To all whom it may concern:*

Be it known that I, EARL D. PEERSTONE, a citizen of the United States, residing at Chicago, in the county of Cook and State of Illinois, have invented new and useful Improvements in Triple-Valve Devices, of which the following is a specification, reference being had to the accompanying drawings, forming a part thereof.

The purpose of this invention is to provide an improved and simplified form of triple valve for use in air-brake systems.

It consists of the features and elements described and shown in the drawings as indicated in the claims.

In the drawings:—Figure 1 is a transverse section of a triple valve embodying this invention showing the parts in "restricted release position." Fig. 2 is a sectional view similar to Fig. 1, but showing the parts in "emergency position." Fig. 3 is a diagram indicating relative positions of the valve and its seat in normal release position. Fig. 4 is a diagram of the first service position. Fig. 5 is a diagram of the first service lap position. Fig. 6 is a diagram of the second service position. Fig. 7 is a diagram of the second service lap position. Fig. 8 is a diagram of the emergency position. Fig. 9 is a diagram of the valve in restricted release position. Fig. 10 is a detail section of the valve taken as indicated at line 10—10 on Fig. 3. Fig. 11 is a detail section taken as indicated at line 11—11 on Fig. 4. Fig. 12 is a detail section taken as indicated at line 12—12 on Fig. 1.

The valve illustrated in section in Figs. 1 and 2 is constructed in general along the established lines of design for triple valves, but comprises several radical departures from the usual practice which are introduced for purposes of simplification or to improve its operation as compared with those now in use. As is customary, the valve is operated by means of a piston, A, moving in a chamber, B, and subject on one side to train pipe pressure entering through the pipe, C, and on the other side to the auxiliary reservoir pressure admitted through ports, D, from the auxiliary reservoir, a portion of which is indicated at, E. Usually the stem, $A^1$, of the piston, A, is employed to move a compound valve, which consists of a slide valve and a graduating valve, the former being connected to the piston stem in a way to permit a certain amount of lost motion relatively thereto, but in the present instance there is but the one valve member, F, carried without lost motion between lugs, $A^2$, and held in contact with the valve seat by any preferred form of spring, $A^3$. In order to decrease friction and to increase reliability of operation the area of the valve seat, $B^1$, is reduced to a minimum, its ports being all arranged in a single line extending transversely of the direction of movement of the valve. The resulting valve seat is a mere rectangular boss formed on the inner wall of the valve chamber, $B^2$, and opposes very little frictional resistance to the operation of the piston, A, in the usual manner by slight variations in train pipe pressure. But, in the ordinary triple valve the friction of the slide valve against its seat has a certain function when combined with the lost motion of the slide valve and to take the place of the slide valve for the performance of this special function there is provided in this construction a friction shoe, G, carried between the stop, $A^2$, and the stop, $A^4$, on the piston stem, and shorter than the distance between these stops by a distance calculated to introduce the proper amount of lost motion in the action. As in the case of the valve member, F, a spring, $A^5$, is supplied to maintain contact between the shoe, G, and the wall of the valve chamber.

The somewhat diagrammatic view of Fig. 3 indicates the relation of the ports of the valve to the ports of the valve seat in what is known as normal or full release position. It will be noted that the valve-seat, $B^1$, is provided with four ports. Port, 1, leads to the atmosphere and is further identified by the abbreviation Ex. signifying exhaust. Port, 2, is a full size duct leading to the brake cylinder, as clearly indicated in Figs. 1 and 2 and in the diagrams is marked B. C. signifying brake cylinder. Port, $2^a$, is a branch of the duct, 2, but of considerably smaller cross section than the said duct, 2, so as to furnish a comparatively restricted communication with the brake cylinder. Port, 3, is a duct of the same size as the port, $2^a$, and branches off from the train pipe near the point where the latter enters the piston chamber, B, as shown in Figs. 1 and 2; the ports, 1 and 2, are connected together by means of the recess, 4, in the face of the valve member, such connection permitting the air in the brake cylinder to exhaust to the atmosphere thus releasing the brakes. At the same time, the train pipe port, 3, connects with the recess, 5, of the valve member, and this recess extending longitudinally of said valve member overhangs the boss or valve seat, $B^1$, at, $5^a$, so as to permit communication between the train pipe and the auxiliary reservoir through the valve chamber, $B^2$, said chamber being at all times in communication with the reservoir through the ports, D. Additional communication between the train pipe and reservoir for the same purpose is furnished through the usual form of feed port, $B^4$, which is uncovered in the wall of the piston chamber, B, when the piston stands in release position.

Ordinary application of the brakes is accomplished in the usual manner, that is, by a reduction of train pipe pressure which causes the piston, A, to move toward the train pipe end of its chamber, B, bringing the slide valve, F, to the first service position indicated in Fig. 4 with its ports, 6 and 7, alined with the ports of the valve seat. Port, 6, opens straight through the valve member, F, and thus by registration with port, 2, furnishes air from the auxiliary reservoir to the brake cylinder. At the same time, ports, 3 and $2^a$, are connected together by means of the recess, 7, and some train pipe air is thus discharged into the brake cylinder. When the pressure in the auxiliary reservoir has reduced to a little under the pressure in the train pipe, the piston, A, moves back toward release position. It is arrested, however, as soon as the friction shoe, G, is picked up by the stop, $A^2$, since a difference of pressures which is just sufficient to cause this initial movement of the piston is inadequate to overcome the additional resistance of the friction shoe, G. The travel of the piston is, therefore, limited in amount to the lost motion in the connections between the piston and the friction shoe, G, this limitation of piston travel being the primary function of the lost motion in these connections. Thus the valve comes to rest in what is known as "service lap position" (see Fig. 5), in which all ports of the valve seat, $B^1$, are closed by the face of the valve member, F. This leaves the brakes set until further manipulation of train pipe pressure is employed to release or set them with greater pressure. Should the pressure in the train pipe reduce faster than the pressure in the auxiliary reservoir, the piston, A, will move farther toward the train pipe side of the chamber, B, carrying the valve, F, past the first service position in which, as is indicated in Fig. 6, the discharge from the train pipe is discontinued, the valve F, being provided with the single port, 8, which registers in this position with port, 2, of the valve seat, thus furnishing air from the auxiliary reservoir to the brake cylinder. When the desired reduction of auxiliary reservoir pressure has taken place the valve will move to a lap position in the same manner as already described with respect to the first service position, where it will remain until further manipulation of the train pipe pressure. This second service lap position occurs between the first and second service positions of the valve as indicated in Fig. 7.

It will be understood that the two service positions of the valve together with the arrangement for release provide for all ordinary manipulation of the brakes. When, however, an emergency application is desired a quick reduction in train pipe pressure, which may be occasioned by the breaking of a hose or by quick reduction at the engineer's valve, will cause the piston, A, to travel from normal release position to the opposite end of its cylinder, B, where its extension knob, $A^6$, will engage the emergency valve, H, opening the same against the resistance of its graduated spring, $H^1$, and thus admitting train pipe air from the cylinder, B, to the chamber, $H^2$, whence it will flow through the large conduit, $H^3$, past the check valve, $H^4$, to the brake cylinder, as indicated in Fig. 2. At the same time, the port, 9, of slide valve, F, registers with port, 2, of the valve seat, thus admitting air from the auxiliary reservoir to the brake cylinder.

After any application of the brakes the pressure of the auxiliary reservoir will have fallen below standard train pipe pressure, so that when the train pipe is connected with the main reservoir this excess of train pipe pressure will return the piston, A, with the valve, F, to release position, in which the auxiliary pressure will build up again to its normal value, while the brake cylinder is vented and the brakes thus released. If a more gradual release of the brakes is desired, the pressure in the train pipe may be quickly raised at the forward end of the train, and thus overcoming the resistance of the spring, $J^1$, the valve may be sent to restricted release position, as illustrated in Fig. 1, in which the end of the stem, $A^1$, which projects beyond the adjusting nut, $A^7$, collides with the yielding abutment, J, in the head of the valve chamber, compressing the spring, $J^1$, and permitting the valve, F, to travel past its normal release position until the nut, $A^7$, contacts with the head of the valve chamber at, $A^8$. By referring to Fig. 9 it will be seen that in this position of the valve, F, the port, 5, does not overhang the valve seat at, $5^a$, so much as in normal release position, and the port, 4, registers only imperfectly with ports, 1 and 2; thus the exhaust from the brake cylinder is comparatively restricted and the equalization between the train pipe and auxiliary reservoir through the port, 5ª, is slower than in full release position. If it is preferred to throw the restricted release feature out of service entirely the nut, A⁷, may be screwed up flush with the end of the piston stem, A, so as to contact with the head of the chamber at, A⁸, before the piston stem has passed this point. Or, at will the adjusting nut, A⁷, may be thrown out of service entirely and the adjustable stop, J², may be employed to take its place in limiting the travel of the valve past normal release position. It will be understood that as the auxiliary reservoir pressure approaches the value of the train pipe pressure the spring, J¹, will operate to return the piston stem and the valve, F, to normal release position, where the parts will remain until the valve is again manipulated by varying the train pipe pressure from the engineer's valve or elsewhere. As shown, the yielding abutment, J, and its related parts are supported in a yoke, J³, which projects into the auxiliary reservoir, but it is evident that this particular arrangement is not an essential part of the invention. According to common practice the pipe, K, which connects with the brake cylinder is shown passing through the auxiliary reservoir, but this arrangement is also optional.

I claim:—

1. In a triple valve device comprising a piston movable by variations in train pipe pressure, and a slide valve operated thereby for controlling communication between the auxiliary reservoir and the brake cylinder, an emergency valve controlling communication between the train pipe and the brake cylinder and positioned in the path of the said piston for operation thereby, a spring adapted to seat said emergency valve in opposition to train pipe pressure, the said slide valve being arranged to open communication between the auxiliary reservoir and the brake cylinder when the said emergency valve is opened by the piston.

2. In a triple valve device comprising a piston movable by variations in train pipe pressure, a chamber in which said piston moves, having an inlet port from the train pipe and an outlet port communicating with the brake cylinder, a valve controlling said outlet and positioned to be opened by the piston at the limit of its travel in opposition to the train pipe pressure, and a spring adapted to seat said valve in opposition to train pipe pressure.

3. In a triple valve device comprising a piston movable by variations in train pipe pressure and a slide valve operated thereby, a valve chamber provided with a valve seat for said slide valve comprising a boss on the valve chamber wall of comparatively small extent in the direction of movement of the valve, said valve seat having ports communicating with the atmosphere, with the train pipe and with the brake cylinder.

4. In a triple valve device comprising a piston movable by variations in train pipe pressure and a slide valve operated thereby, a valve chamber provided with a valve seat for said slide valve comprising a boss on the valve chamber wall of comparatively small extent in the direction of movement of the valve, said valve seat having ports communicating with the train pipe and with the brake cylinder.

5. In a triple valve device comprising a piston movable by variations in train pipe pressure and a slide valve operated thereby, a valve chamber provided with a valve seat for said slide valve comprising a boss on the valve chamber wall of comparatively small extent in the direction of movement of the valve, said valve seat having ports communicating with the atmosphere, with the train pipe and with the brake cylinder, and a friction shoe also carried by the piston in contact with the valve chamber wall for steadying the movement of the piston and valve.

6. In a triple valve device comprising a piston movable by variations in train pipe pressure and a slide valve operated thereby, a valve chamber provided with a valve seat for said slide valve comprising a boss on the valve chamber wall of comparatively small extent in the direction of movement of the valve, said valve seat having ports communicating with the train pipe and with the brake cylinder, and a friction shoe also carried by the piston in contact with the valve chamber wall for steadying the movement of the piston and valve.

7. In a triple valve device comprising a piston movable by variations in train pipe pressure, a slide valve carried positively between stops on said piston and movable thereby to a service position for opening communication between the auxiliary reservoir and the brake cylinder and communication between the train pipe and the brake cylinder, and a friction shoe also carried between stops on the piston, but with lost motion sufficient to permit movement of said piston and slide valve to a position for cutting off both the said avenues of communication without movement of said shoe.

8. In a triple valve device comprising a piston movable by variations in train pipe pressure, a slide valve carried positively between stops on said piston and movable thereby to a service position for opening communication between the train pipe and the brake cylinder, and a friction shoe also carried between stops on the piston, but with lost motion sufficient to permit movement of said piston and slide valve to a position for cutting off the said avenue of communication without movement of said shoe.

9. In a triple valve device comprising a piston movable by variations in train pipe pressure and a valve operated thereby for opening communication between the brake cylinder and the atmosphere and between the train pipe and the auxiliary reservoir at the normal limit of movement of said piston in one direction for releasing the brakes and equalizing the train pipe and reservoir pressures, further movement of the valve beyond such normal limit being adapted to restrict such communication, yielding resistance means opposing movement of the valve beyond such limit, and an adjustable stop for positively limiting such excess movement.

10. In a triple valve device comprising a piston movable by variations in train pipe pressure and a valve operated thereby for opening communication between the brake cylinder and the atmosphere at the normal limit of movement of said piston in one direction for releasing the brakes, further movement of the valve beyond such normal limit being adapted to restrict such communication, yielding resistance means opposing movement of the valve beyond such limit, and an adjustable stop for positively limiting such excess movement.

11. In a triple valve device comprising a piston movable by variations in train pipe pressure and a slide valve carried positively between stops on said piston for opening communication between the brake cylinder and the atmosphere and between the train pipe and the auxiliary reservoir at the normal limit of movement of said piston in one direction, for releasing the brakes and equalizing the train pipe and reservoir pressures, further movement of the valve beyond such normal limit being adapted to restrict such communication, yielding resistance means opposing movement of the valve beyond such limit, and a friction shoe also carried between stops on the piston but with lost motion sufficient to permit the return movement of the piston and slide valve from restricted release position to normal release position without moving the said shoe.

12. In a triple valve device comprising a piston movable by variations in train pipe pressure and a slide valve carried positively between stops on said piston for opening communication between the brake cylinder and the atmosphere at the normal limit of movement of said piston in one direction, for releasing the brakes, further movement of the valve beyond such normal limit being adapted to restrict such communication, yielding resistance means opposing movement of the valve beyond such limit, and a friction shoe also carried between stops on the piston but with lost motion sufficient to permit the return movement of the piston and slide valve from restricted release position to normal release position without moving the said shoe.

13. In a triple valve device comprising a piston movable by variations in train pipe pressure and a valve operated thereby for opening communication between the brake cylinder and the atmosphere and between the train pipe and the auxiliary reservoir at the normal limit of movement of said piston in one direction for releasing the brakes and equalizing the train pipe and reservoir pressures, further movement of the valve beyond such normal limit being adapted to restrict such communication, and means adjustable to a position for preventing movement of the valve beyond the normal limit.

14. In a triple valve device comprising a piston movable by variations in train pipe pressure and a valve operated thereby for opening communication between the brake cylinder and the atmosphere at the normal limit of movement of said piston in one direction for releasing the brakes, further movement of the valve beyond such normal limit being adapted to restrict such communication, and means for preventing movement of the valve beyond the normal limit.

15. In a triple valve device comprising a piston movable by variations in train pipe pressure and a valve operated thereby for opening communication between the brake cylinder and the atmosphere and between the train pipe and the auxiliary reservoir at the normal limit of movement of said piston in one direction for releasing the brakes and equalizing the train pipe and reservoir pressures, further movement of the valve beyond such normal limit being adapted to restrict such communication, and a stop for preventing movement of the valve beyond the normal limit.

16. In a triple valve device comprising a piston movable by variations in train pipe pressure and a slide valve carried thereby which is movable from brake release position to a first service position for opening communication between the auxiliary reservoir and the brake cylinder, and communication between the train pipe and the brake cylinder, further movement of the piston in the same direction being adapted to carry the said valve to a second service position, shutting off communication between the train pipe and brake cylinder and affording communication between the said reservoir and brake cylinder, and said slide valve having a lap position between the first service position and the second service position.

17. In a triple valve device comprising a piston movable by variations in train pipe pressure and a slide valve carried thereby which is movable from brake release position to a first service position for opening communication between the auxiliary reservoir and the brake cylinder, and communication between the train pipe and the brake cylinder, further movement of the piston in the same direction being adapted to carry the said valve to a second service position, shutting off communication between the train pipe and brake cylinder and affording communication between the said reservoir and brake cylinder, and a friction shoe carried between stops on the piston but with lost motion sufficient to permit movement of said piston and slide valve to a position between the two said service positions for cutting off all avenues of communication to the brake cylinder without moving the said shoe.

18. In a triple valve comprising a piston movable by variations in train pipe pressure, a slide valve movable thereby to a service position for effecting communication from the auxiliary reservoir to the brake cylinder and local discharge from the train pipe, and a friction shoe carried between stops on the piston, but with lost motion sufficient to permit movement of said piston and slide valve to a position for closing both the said avenues of discharge without movement of said shoe.

19. In a triple valve device comprising a piston movable by variations in train pipe pressure, a slide valve operated thereby and movable from release position to a service position for effecting communication from the auxiliary reservoir to the brake cylinder and local discharge from the train pipe, said valve being movable further in the same direction to a second service position for effecting communication between the auxiliary reservoir and the brake cylinder, and discontinuing the said local discharge from the train pipe, and having a return movement in the opposite direction to a lap position between the first service position and the second service position.

20. In a triple valve device comprising a piston movable by variations in train pipe pressure and a valve operated thereby for controlling the discharge of air from the brake cylinder in release position, and having a further inward range of movement beyond release position for the purpose of reducing the rate of discharge from the brake cylinder, and a stop for preventing movement of the valve beyond release position.

21. A triple valve device comprising a valve and piston operated by variations in train pipe pressure for controlling the passage of air from the train pipe to the auxiliary reservoir in normal release position, and having a further inward range of movement beyond normal release position for partly or wholly closing the passage from the train pipe to the auxiliary reservoir, yielding resistance means opposing the movement of the valve beyond normal release position, and an adjustable stop for positively limiting such further movement beyond normal release position.

In testimony whereof I have hereunto set my hand at Chicago, Illinois, this 7th day of June, 1912.

EARL D. PEERSTONE.

Witnesses:
ROBT. N. BURTON,
EDNA M. MACINTOSH.